I. C. LINDLEY.
IMPLEMENT ATTACHMENT FOR TRACTORS.
APPLICATION FILED JULY 21, 1917.
1,330,198.
Patented Feb. 10, 1920.
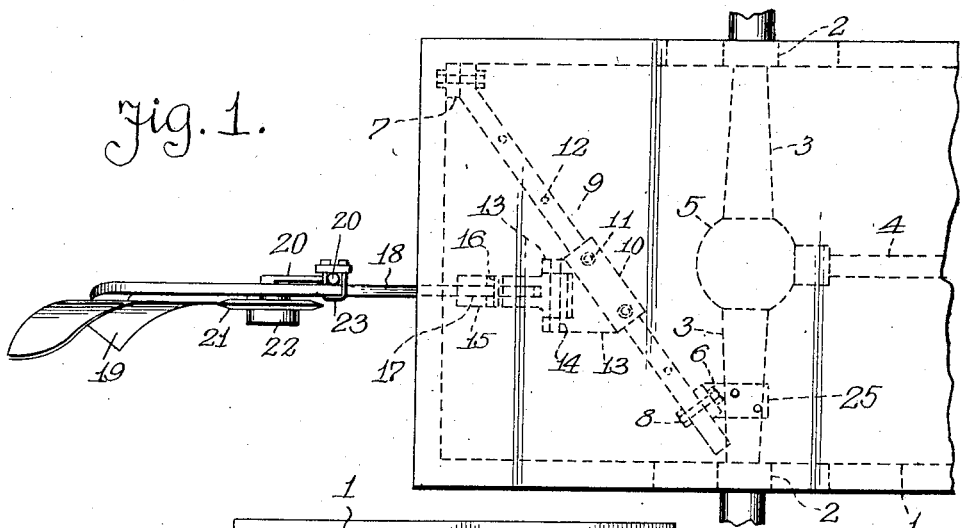
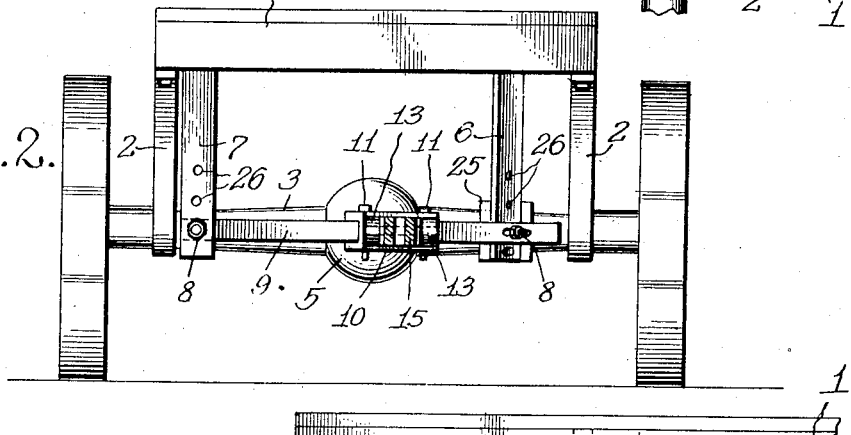
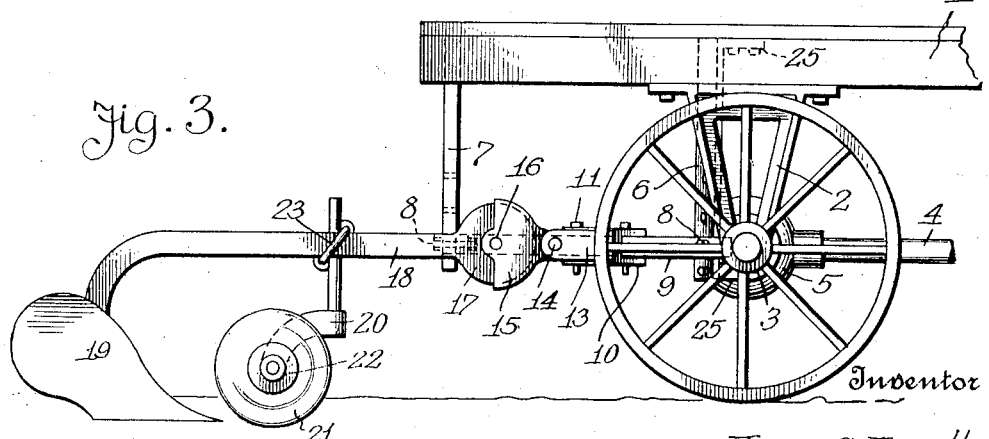
Inventor
Isaac C. Lindley,
Attorneys

UNITED STATES PATENT OFFICE.

ISAAC C. LINDLEY, OF LUPTON, MICHIGAN.

IMPLEMENT ATTACHMENT FOR TRACTORS.

1,330,198.   Specification of Letters Patent.   Patented Feb. 10, 1920.

Application filed July 21, 1917. Serial No. 181,959.

*To all whom it may concern:*

Be it known that I, ISAAC C. LINDLEY, a citizen of the United States of America, residing at Lupton, in the county of Ogemaw and State of Michigan, have invented certain new and useful Improvements in Implement Attachments for Tractors, of which the following is a specification, reference being had therein to the accompanying drawings.

This invention relates to an implement attachment for tractors, and my invention aims to provide positive and reliable means, in a manner as hereinafter set forth, for attaching one or more implements to a tractor or other vehicle, so that the soil can be expeditiously tilled, especially at a desired depth.

My invention further aims to provide an implement attachment or draft appliance that may be adjusted so that one or more plows or implements may be properly drawn through the soil irrespective of the angularity of the rear end of the tractor or vehicle, that is, the fact that one wheel of the tractor may be in a furrow, and the other wheel on the crest of a furrow or unplowed ground does not affect the position of a plow or other implement as to interfere with its use.

My invention will be hereinafter more fully considered and reference will now be had to the drawing, wherein—

Figure 1 is a plan of a portion of the tractor or vehicle provided with the attachment.

Fig. 2 is a rear elevation of the vehicle partly in section, and

Fig. 3 is a side elevation of the same.

In the drawing, the reference numeral 1 denotes the frame or body of a tractor and this frame or body is supported by bearings 2 above the rear axle housing or casing 3 containing an axle or wheel shafts driven from a power shaft 4 through a differential mechanism 5. The elements 1 to 5 inclusive are of a conventional form and may represent any well known tractor, truck or self propelled vehicle.

The frame 1 and the rear axle housing 3 at one side of the tractor, are connected at the places indicated 25 by an upright 6 and at the opposite side of the tractor, the rear end of the frame has a depending member or hanger 7, said hanger and the upright 6 having a series of apertures 26 adapted to receive pins or bolts 8 so that the ends of a trailer bar 9 may be connected thereto, and if necessary, said trailer bar positioned with one end higher than the other.

The trailer bar 9 is disposed at an angle relative to the rear axle housing 3 and said bar is preferably rectangular in cross section so as to prevent a trailer member or sleeve 10 from rotating thereon. The trailer member 10 has one or more pins 11 adapted to engage in one or more openings 12 provided therefor in the trailer bar, said pins preventing the trailer member from shifting longitudinally of said bar. The trailer member 10 has apertured ears 13 and pivotally connected thereto by a pin 14 is a forked member 15. Pivotally mounted in the bifurcation of the member 15 by a pin 16 or other pivotal means is the head 17 of a plow beam 18 having a shear or blade 19.

Attached to the plow beam 18 is a colter provided with a cutting disk 21 and rollers or wheels 22 at the sides of said disk, the wheels 22 being adapted to travel on the surface of the soil, and the cutter disk 21 enter the soil and sever roots, clods of earth, and other matter. The colter 20 may be attached to the plow beam 18 by a shackle 23 or other fastening means.

During plowing operations, the pivotal connections between the plow beam 18 and the trailer member 10 permit of the plow beam 18 being adjusted, and when one wheel of the tractor is to travel on unplowed ground and the other in a furrow, then the tractor bar 19 can be placed at an inclination which will tend to maintain the plow share 19 in a vertical plane.

The length of the tractor bar 9 is such as to accommodate a plurality of plows or other implements, and by removing the trailer bar 9 it is possible to use the tractor for other purposes than that of drawing plows or implements.

One embodiment of my invention has been illustrated, but it is to be understood that the structural elements are susceptible to such variations and modifications as fall within the scope of the appended claim.

What I claim is:—

Means adapted for attaching an implement to a tractor, comprising a hanger and upright adapted for attachment to the tractor, the hanger being at the extreme end of the tractor and at one side thereof, the upright being at the other side of the tractor and in advance of said hanger, a trailer bar adapted to be placed at an angle to the rear axle housing of said tractor and one end of the bar connected to the upright and the other end thereof adjustably connected to the hanger so that said bar may be tilted, a trailer member slidable on said bar, means for fixing said member relative to said bar, and a forked member pivotally connected to said trailer member, and adapted to have an implement attached to the forked portion thereof.

In testimony whereof I affix my signature in the presence of two witnesses.

ISAAC C. LINDLEY.

Witnesses:
P. D. POST,
E. J. RAKESTRAW.